(12) United States Patent
Bikel et al.

(10) Patent No.: US 8,903,090 B2
(45) Date of Patent: Dec. 2, 2014

(54) SECURELY CLASSIFYING DATA

(75) Inventors: Daniel Martin Bikel, Mount Kisco, NY (US); Jeffrey Scott Sorensen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1479 days.

(21) Appl. No.: 12/111,538

(22) Filed: Apr. 29, 2008

(65) Prior Publication Data

US 2009/0268908 A1    Oct. 29, 2009

(51) Int. Cl.
*H04L 29/06* (2006.01)
*H04L 9/30* (2006.01)

(52) U.S. Cl.
CPC ............. *H04L 9/30* (2013.01); *H04L 2209/16* (2013.01); *H04L 2209/08* (2013.01); *H04L 2209/50* (2013.01)
USPC .............................. 380/255; 380/30; 380/262

(58) Field of Classification Search
USPC ................... 380/30, 255, 262; 705/7.11, 7.26
See application file for complete search history.

(56) References Cited

U.S. PATENT DOCUMENTS

| | | | |
|---|---|---|---|
| 4,200,770 A | | 4/1980 | Hellman et al. |
| 4,405,829 A | | 9/1983 | Rivest et al. |
| 6,978,372 B1 * | 12/2005 | Jakobsson .................... 713/180 |
| 7,054,444 B1 | | 5/2006 | Paillier |
| 2002/0126872 A1 * | 9/2002 | Brunk et al. ................... 382/100 |
| 2005/0102107 A1 * | 5/2005 | Porikli ............................ 702/20 |
| 2005/0257045 A1 * | 11/2005 | Bushman et al. ............. 713/156 |
| 2005/0259817 A1 | | 11/2005 | Ramzan et al. |
| 2007/0053507 A1 | | 3/2007 | Smaragdis et al. |
| 2007/0140479 A1 | | 6/2007 | Wang et al. |
| 2007/0220094 A1 | | 9/2007 | Kerschbaum et al. |

OTHER PUBLICATIONS

A. Viterbi, "Convolutional Codes and Their Performance in Communication Systems," IEEE Transactions on Communications Technology, Oct. 1971, pp. 751-772, vol. 19, No. 5.
L.R. Rabiner, "A Tutorial on Hidden Markov Models and Selected Applications in Speech Recognition," Procs. of the IEEE, Feb. 1989, pp. 257-286, vol. 77, No. 2.
P. Smaragdis et al., "A Framework for Secure Speech Recognition" in IEEE International Conference on Acoustics, Speech, and Signal Processing, 2007, 10 pages.
M. Atallah et al., "Secure and Private Sequence Comparisons" in Proc. of the 2003 ACM Workshop on Privacy and the Electronic Society (WPES), Oct. 2003, 6 pages.
T. Elgamal, "A Public-Key Cryptosystem and a Signature Scheme Based on Discrete Logarithms," IEEE Trans. Information Theory, Jul. 1985, pp. 10-18, vol. IT-31.

(Continued)

*Primary Examiner* — Justin T Darrow
(74) *Attorney, Agent, or Firm* — Anne V. Dougherty; Ryan, Mason & Lewis, LLP

(57) ABSTRACT

Techniques are disclosed for securely classifying or decoding data. By way of example, a method of determining a most likely sequence for a given data set comprises a computer system associated with a first party performing the following steps. An encrypted model is obtained from a second party. The encrypted model is utilized to determine cost values associated with a particular sequence of observed outputs associated with the given data set. The cost values are sent to the second party. At least one index of a minimum cost value determined by the second party from the cost values sent thereto is obtained from the second party. A minimum cost sequence resulting from the at least one index is determined as the most likely sequence.

19 Claims, 4 Drawing Sheets

(56) References Cited

OTHER PUBLICATIONS

A. Yao, "Protocols for Secure Computation," IEEE Annual Symposium on the Foundations of Computer Science, 1982, pp. 1-5.

P. Paillier, "Public-Key Cryptosystems Based on Composite Degree Residuosity Classes," Eurocrypt, Lecture Notes in Computer Science, 1999, pp. 223-238, vol. 1592.

* cited by examiner

SECURELY CLASSIFYING DATA

FIELD OF THE INVENTION

This invention relates generally to classifying data, and more particularly to securely classifying data.

BACKGROUND OF THE INVENTION

A problem that frequently arises in communication systems engineering is one related to identifying the most likely sequence of states responsible for producing an observed sequence of symbols. In communication system environments, this problem is typically addressed by a decoder. Algorithms for decoding data are well known. One of the most well-known is the Viterbi algorithm, see A. Viterbi, "Convolutional Codes and their Performance in Communication Systems," IEEE Trans. on Communications, vol. 19. no. 5, pp. 751-772, 1971, the disclosure of which is incorporated by reference herein.

However, there are times and situations when it would be desirable to limit the amount of information disclosed during the decoding process. Unfortunately, the Viterbi algorithm and other known decoding algorithms do not address this concern.

SUMMARY OF THE INVENTION

Principles of the invention provide techniques for securely classifying or decoding data.

By way of example, in one embodiment, a method of determining a most likely sequence for a given data set comprises a computer system associated with a first party performing the following steps. An encrypted model is obtained from a second party. The encrypted model is utilized to determine cost values associated with a particular sequence of observed outputs associated with the given data set. The cost values are sent to the second party. At least one index of a minimum cost value determined by the second party from the cost values sent thereto is obtained from the second party. A minimum cost sequence resulting from the at least one index is determined as the most likely sequence.

Advantageously, as will be evident, illustrative principles of the invention provide a method of determining the most likely sequence of states where the holder of the model parameters is not permitted to see the observed sequence of outputs generated by the unknown sequence of states. Furthermore, illustrative principles of the invention provide a method of decoding the most likely sequence of states where the observer of the generated sequence is not permitted to learn the model parameters of the state machine that generated the sequence. Still further, illustrative principles of the invention provide a method of performing the Viterbi dynamic programming algorithm in the context of secure function evaluation that is of reasonable computational complexity.

These and other objects, features, and advantages of the present invention will become apparent from the following detailed description of illustrative embodiments thereof, which is to be read in connection with the accompanying drawings.

DETAILED DESCRIPTION

Figure 1:
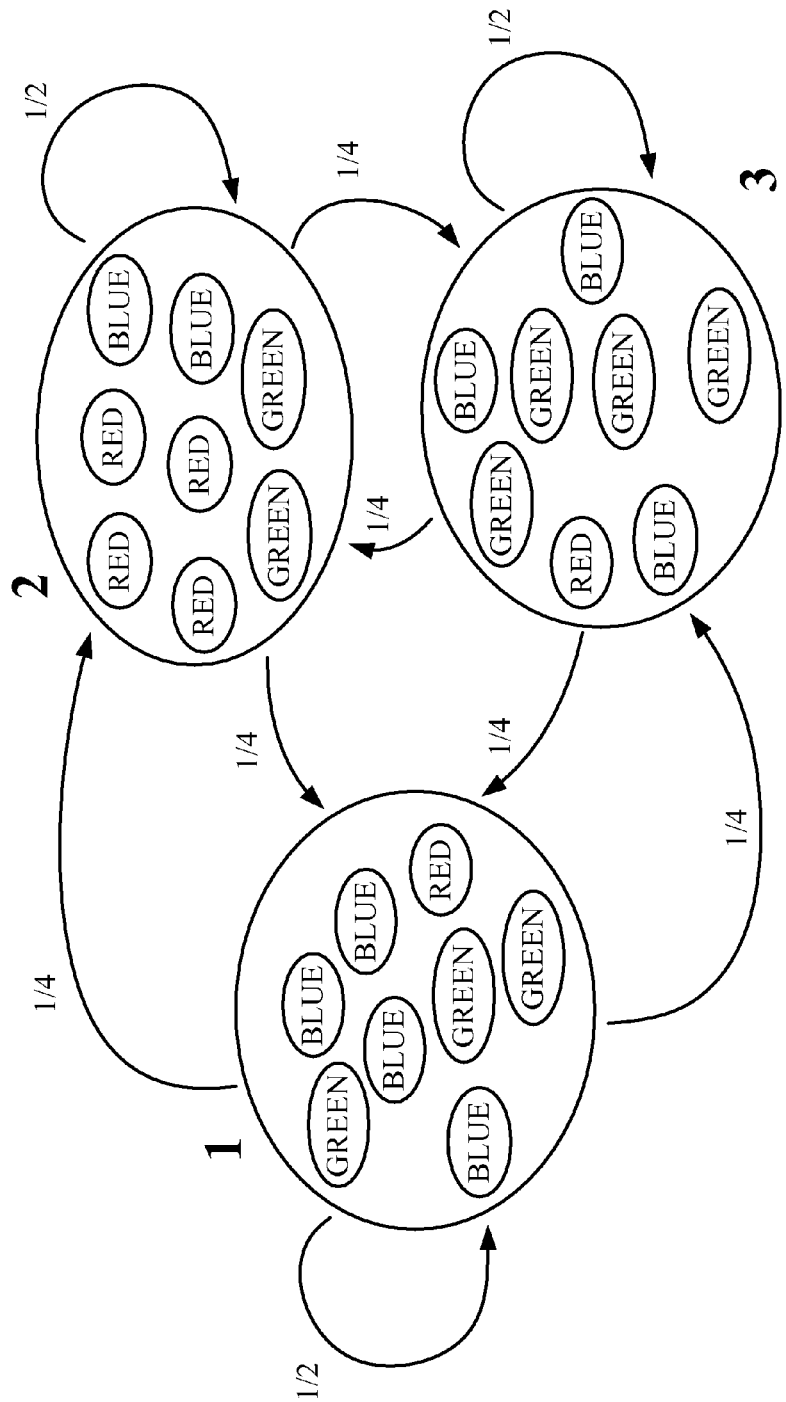
FIG. 1 is a diagram of a simple hidden Markov model and its parametric characterization.

Illustrative principles of the invention will be described below. Prior thereto, we will explain certain realizations that have been made in accordance with such principles of the invention.

The application of information technologies promises to bring great benefits to fields such as law, banking, entertainment and medicine. Already, however, a great many concerns have arisen about the possible compromises that are made when personal information and characteristics of people are made available for research. The same techniques that can be used to diagnose a disease can also potentially be used exploitatively.

Within the cryptographic research community, mathematical proofs have demonstrated that many of these compromises are, in principle, unnecessary. It has already been demonstrated that two or more parties can securely compute the output of a function of each of their respective inputs without disclosing those inputs to each other. This very general result is usually attributed to Yao, A. C. (1982) "Protocols for secure computation" in *IEEE Annual Symposium on the Foundations of Computer Science* pages 160-164, the disclosure of which is incorporated by reference herein.

Consider the implications of such a system: suppose that a doctor has, through extensive research, built a model that predicts what disease a person has, and the treatment most likely beneficial, using the answers to a number of diagnostic questions. Such a model, in itself, might be of considerable value as intellectual property. Now suppose that a patient, wishing to remain anonymous, wanted to use this model but did not want to reveal any answers to questions posed by the doctor as they would be sufficiently unique as to identify the patient.

This common circumstance is normally dealt with using agreements of confidentially and trusted intermediate parties. Such obligations require trust between the parties, and such trust relationships do not always exist. Just as the patient wishes to keep the specifics of his medical condition private, so does the doctor wish to protect his considerable investment in designing his diagnostic model. If trust does not exist between these parties, we would seem to be at an impasse. Similar potential cost and benefit choices arise in all of the many relationships that can arise between individuals, commercial entities, governments, and organizations.

Secure function evaluation can remove the trust requirements. In the case of the hypothetical doctor and patient, secure function evaluation can provably demonstrate that the patient would learn nothing about the model beyond that information relating to his particular condition. Likewise, the doctor would learn nothing about the condition of the patient or even the diagnosis of his own model. This, at first, seemingly counterintuitive result can be accomplished through the use of oblivious transfer.

Oblivious transfer, as first described by Rabin, M. O. (1981) "How to exchange secrets by oblivious transfer" Technical Report TR-81 Aiken Computation Laboratory, Harvard University, the disclosure of which is incorporated by reference herein, is a method of sending two or more messages from one party to another. The second party chooses one and only one of the messages which they receive. The other messages are lost. The first party does not learn which message the receiver chose. Real-world examples of oblivious transfer arise naturally out of quantum systems. More practically, methods employing cryptographic techniques have been used to build oblivious transfer systems.

However, oblivious transfer is an expensive proposition, and the general results for secure function evaluation have proved to be impractical for the realization of secure systems. Recent work in the cryptographic literature has focused on finding alternative methods of accomplishing the same result without the extreme computational overhead.

Accordingly, as will be described herein, principles of the invention provide such a method for the general problem of decoding via the Viterbi algorithm the most likely sequence of states that correspond to a sequence. Further, a method is provided for an owner of set of hidden Markov model parameters to publish these parameters in such a way as to provide semantic security with regard to the values of the parameters of this model. As well, a method is provided for an owner of a sequence to be labeled to compute, using the encrypted model parameters, a single iteration of the Viterbi algorithm based upon a single symbol of the input. Still further, a method is provided for the owner of the hidden Markov model to provide a minimum finding service that allows the model owner to reveal the index of the smallest value needed to complete the inner loop of the Viterbi algorithm, without the owner learning any usable information about the sequence being decoded.

A hidden Markov model (HMM) is a doubly stochastic process: a stochastic state machine evolves in time according to a state transition matrix, and for each state randomly emits a symbol from an alphabet according to a state output distribution.

The Viterbi algorithm is a way of computing the most likely state sequence corresponding to a given set of output symbols. The HMM and Viterbi algorithm are used in a great number of sequence-decoding applications.

An HMM is specified by the quintuple $\{Q, \Sigma, A, B, \pi\}$ where Q is a set of N states, $\Sigma$ is a set of output symbols, A is a state transition matrix of size N×N, and B is a state output matrix of size N×|$\Sigma$| and $\pi$ is a vector of size N that specifies the initial state probability vector.

FIG. 1 presents a trivial example of a hidden Markov model that comprises three distinct states. Consider each of these states to be an urn with a different distribution of colored balls. With each time step in time, a ball is drawn from the current urn, the color is announced and then the ball is returned. Then, according to the probabilities on the arcs, the drawing will remain at the current urn or transition to another urn. This particular model happens to have the same number of states as outputs, although this is not necessary.

Without loss of generality, we will assume that probability values will be represented as negative log probabilities where certainty is represented as the additive identity, zero. All model parameters are scaled by multiplying by a constant before taking the log to insure that the essential character of the model can be captured with integer values.

Impossibility, which mathematically maps to on will be capped to a maximum value f as with all other values that are greater than f. When performing math operations, the accumulators will be large enough to insure that sums of sequences of length T will not overflow. That is, accumulators must be at least $1+2NT+\lceil \log_2 f \rceil$ bits.

For the hidden Markov model in FIG. 1, converting it to negative log probability notation (using here a constant of 10 and a log base of 2) yields:

$$A = \begin{bmatrix} 10 & 20 & 20 \\ 20 & 10 & 20 \\ 20 & 20 & 10 \end{bmatrix} B = \begin{bmatrix} 30 & 10 & 14 \\ 10 & 20 & 20 \\ 30 & 14 & 10 \end{bmatrix} \pi = [16 \ 16 \ 16]$$

All values in these arrays fit within 5 bits, so sequences of around ten samples can easily be handled with a 32-bit accumulator.

For evaluating a hidden Markov model in the insecure fashion, the following equations are evaluated for each observation $o_t$ in an observation vector o, $1 \leq i \leq N$:

$$\delta_1[i] = \pi[i] + B[i, o_1]$$

$$\phi_t[i] = \arg_j \min(\delta_{t-1}[j] + A[j,i])$$

$$\delta_t[i] = \delta_{t-1}[\phi_t[i]] + A[\phi_t[i], i] + B[i, o_t]$$

where $\delta_1[i]$ is the Viterbi score at time step i, $\phi_t[i]$ is a backpointer to the best previous state for time step i and arg minx is defined to be the index of the smallest value of x. Note that the two functions defined above are defined mutually recursively. In particular, the $\delta$ function, also known as the state transition function, captures the Markovian property of the model, viz., that the probability of arriving at a certain state at time t is dependent on the state at time t−1.

Figure 2:
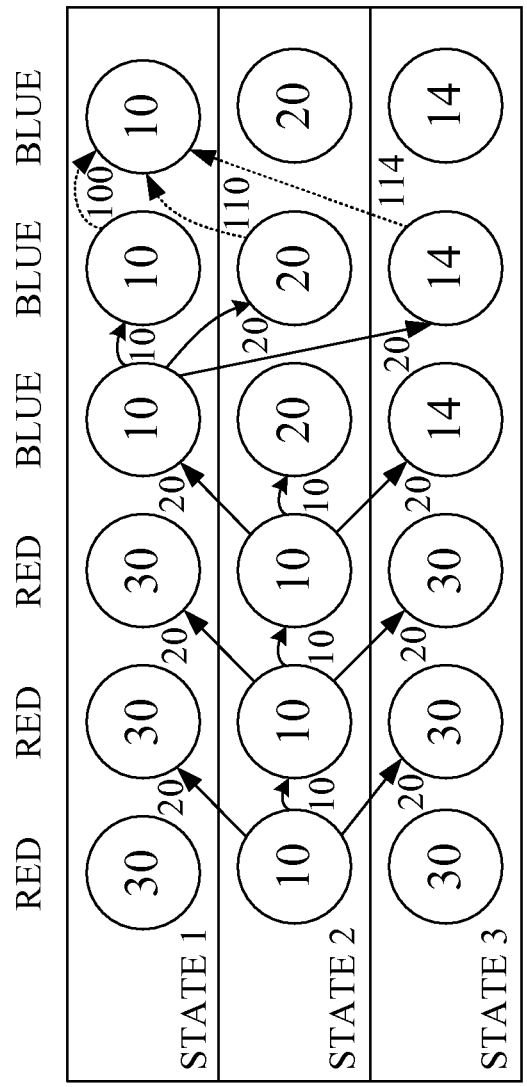
FIG. 2 is a diagram an example search lattice as generated by the hidden Markov model, illustrating one step in the search, according to an embodiment of the invention.

FIG. 2 illustrates the decoding process that results for decoding the sequence of colors "red, red, red, blue, blue, blue." This figure catches the Viterbi algorithm at the point of determining which is the best (least cost, most likely) transition from the second-to-last state to the last state. The best-path solutions for all earlier steps in the sequence are indicated with the chosen optimal path and its weight. The accumulated weights, shown with dotted arrows, leading to the first state indicate that the best path has a score of 100, and we can see that the final lowest cost path with be the state sequence 2, 2, 2, 1, 1, 1 with a total cost of 110.

Secure Viterbi Evaluation

A main goal of secure evaluation is to allow one party to compute $\phi_t$ for a sequence $o_t$ without revealing $o_t$ and without learning anything about A, B, or $\pi$, except for that which is revealed by the values of $\phi_t$ for that particular input.

Homomorphic Public Key Encryption

Public key cryptographic techniques comprise three operations, a key generation function which draws upon a source of randomness R.

$$\{s,p\} = G(R)$$

an encryption function that uses the public key p to encrypt message m into ciphertext c $$c = E(R, p, m)$$

and a decryption function which recovers the encrypted message using the secret key s $$m = D(s, c)$$

Homomorphic encryption systems also allow for a math operation to be performed on the ciphertexts, such that:

$$D(s,E(R,p,m_1)\cdot E(R,p,m_2))=m_1\odot m_2$$

where $\odot$ specifies some mathematical relation between plain texts.

For hidden Markov models, a multiplicative homomorphic encryption scheme would be a reasonable choice. However, our decision to use log space dictates that we use an additive homomorphic encryption scheme. The Paillier asymmetric public-key cryptosystem meets these needs. One form of the Paillier system that can be used is disclosed in U.S. Pat. No. 7,054,444, the disclosure of which is incorporated by reference herein. However, other well-known encryption schemes may be employed, by way of example only, an ElGamal (T. ElGamal, "A public-key cryptosystem and a signature scheme based on discrete logarithms," IEEE Trans. on Information Theory, vol. 31, no. 4, pp. 469-472, 1985, the disclosure of which is incorporated by reference herein) or a Rivest-Shamir-Adleman (e.g., U.S. Pat. No. 4,405,829, the disclosure of which is incorporated by reference herein) cryptographic method can be used.

Paillier Public Key Cryptosystem

Key generation in the Paillier scheme assumes $q_1$, $q_2$ are large primes, $n=q_1 q_2$ and $\lambda=1$ cm $(q_1-1, q_2-1)$. A public and private key pair can be constructed by choosing random integer p and finding:

$$s^{-1} = \frac{p^\lambda \bmod n^2 - 1}{n}$$

such that:

$$gcd(s^{-1},p)=1$$

so that p is the public key, and s is the private key.

Encryption involves choosing random r so that:

$$c=E(r,p,m)\doteq p^m r^n \bmod n^2$$

and decryption is computed using:

$$m = D(c, s) \doteq \left(\frac{c^\lambda \bmod n^2 - 1}{n} s\right) \bmod n.$$

It is simple to demonstrate that the Paillier cryptosystem is additive homomorphic from these relationships.

Note that the same value has many possible encryptions depending upon the chosen random value r. Furthermore, it is possible to combine any ciphertext with a randomly-chosen encryption of the additive identity zero; such a scheme is equivalent to re-encrypting the same plaintext with a different random value.

Encrypted HMM Parameters

Assuming Alice, the model provider, combines the public key p along with encrypted forms of the parameters of the HMM, such that the $\tilde{A}$ consists of the encrypted elements $\tilde{a}_{ij}=E(r,p,a_{ij})$ and publishes for Bob the set $\{p,\tilde{A},\tilde{B},\tilde{\pi}\}$. Bob may compute using this set:

$$\delta_1[i]=\tilde{\pi}[i]\tilde{B}[i,o_1]$$

$$\delta_t[i]=\delta_{t-1}[\phi_t[i]]\tilde{A}[\phi_t[i],i]\tilde{B}[i,o_t]$$

noting the use of multiplication here instead of addition, as multiplication of Paillier ciphertexts adds their plaintexts.

However, in order to compute $\phi_t[i]$, Bob must interact with Alice. Bob computes the set of values:

$$S=\{\delta_{t-1}[1]\tilde{A}[1,i],\delta_{t-1}[2]\tilde{A}[2,i], \ldots \delta_{t-1}[N]\tilde{A}[N,i]\}$$

and sends them to Alice using the secure arg min protocol discussed below:

$$\phi_t[i]=\arg_j \min S$$

Alice, using the secret key s associated with p can decrypt the values and determine the minimum.

Essentially, Alice provides a arg $\min_p(\cdot)$ service for each published public key p. Even in the ideal case, the best state sequence of the decoder as specified by $\phi_t$ leaks information about the model. It is a core presumption that Bob and Alice have an agreement to allow Bob to process some quantity of length t, so that Bob learns $\phi_t$ and nothing (or not much) else.

In order to ensure that the joint probability of all possible state/observation sequences is one, we add a special terminal symbol to the output alphabet. Bob, after evaluating the model with that symbol, would use the arg min service on the set:

$$F=\{\delta_t[1],\delta_t[2], \ldots \delta_t[N]\}$$

to determine the most likely final state:

$$y_t=\arg_j \min F$$

The final decoding result can be determined using the backpointer values of $\phi$:

$$y_{t-1}=\phi_{t-1}[y_t]$$

yielding the optimal sequence back to $y_1$.

As with any application of hidden Markov models, there are several aspects that can be addressed by those skilled in the arts. Long sequences may require the scores to be rescaled to prevent accumulator overflow. These procedures are well understood by practitioners and can easily be generalized to the case of secure HMM evaluation without difficulty.

Figure 3:
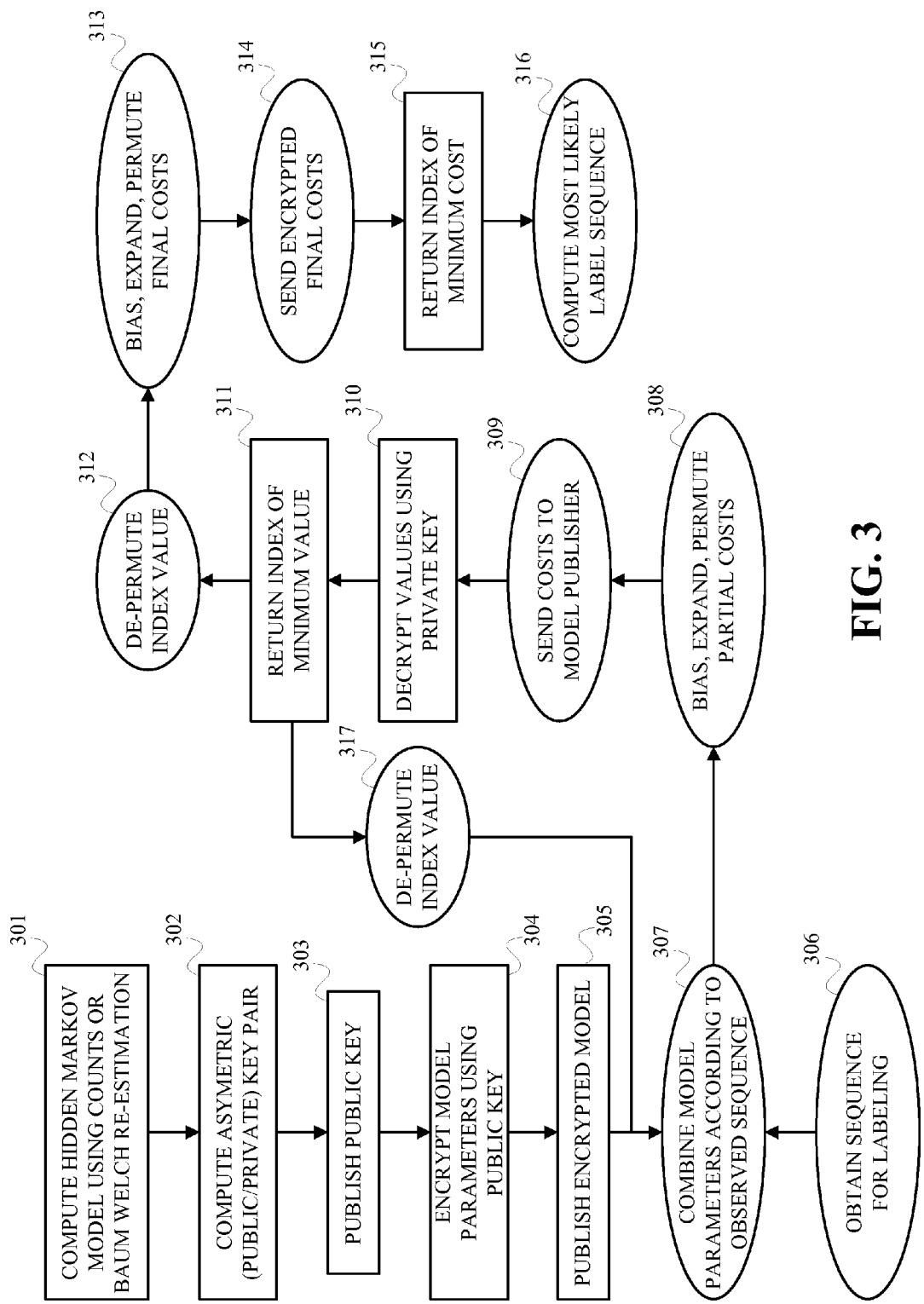
FIG. 3 is a block diagram indicating the steps that each party takes during secure Viterbi decoding, according to an embodiment of the invention.

FIG. 3 details the steps in the decoding process, with steps taken by the party (e.g., Alice) publishing the encrypted hidden Markov model, and providing the arg minimum finding service depicted with rectangular boxes, and the steps taken by parties (e.g., Bob) doing decoding with ovals. It is to be understood that when it is stated that a party performs a step, it is understood that the step is performed in accordance with one or more computing devices (e.g., personal computer, personal digital assistant, laptop, server, etc.) associated with that party.

Thus, in step 301, Alice computes a hidden Markov model using counts or Baum Welch re-estimation. In step 302, Alice computes an asymmetric (public/private) key pair. Alice then publishes the public key in step 303. In step 304, Alice encrypts the model parameters using the public key. Alice then publishes the encrypted model in step 305.

In step 306, Bob obtains a sequence for labeling (classification). Bob combines model parameters according to the observed sequence in step 307. In step 308, partial costs are biased, expanded and permuted by Bob (as will be explained below). Cost values are sent by Bob to Alice in step 309.

Alice decrypts the received values using the private key in step 310. In step 311, Alice returns an index of the minimum value.

Bob then de-permutes the index value in step 312 (this is also done in step 317). In step 313, Bob biases, expands and permutes final costs. Bob sends encrypted final costs in step 314. Alice returns the index of the minimum cost to Bob in step 315. In step 316, Bob computes the most likely label sequence.

Below we provide a more formalistic explanation of the protocol executed between Alice and Bob.

Secure arg min Protocol

The secure arg min protocol is a two-party protocol that securely identifies the index of the minimum value of a set values homomorphically asymmetrically encrypted values using a shared public key p.

Input: Party $P_1$ provides inputs a set S of N homomorphically encrypted plaintexts, encrypted according to public key p.

Output: Party $P_2$ communicates (returns) the index of the minimum value of the set from $P_1$ Protocol Steps:

1. $P_1$ chooses random values b and r, where $b \in \mathbb{Z}$ which is then encrypted b'=E(r, p, b) and each value of S is multiplied by this value.

2. The set S is augmented with $n \geq 0$ or more additional values, where n is a security parameter, and the added values are based on a random element of S, $s_i$, combined with b' and c' where c' is encrypted version of another random value chosen from $\mathbb{Z}^+$.

3. The values of S are permuted using a randomly chosen permutation of size N+n denoted as $\rho(j)$ for j=1, . . . , N+n.

4. The permuted values are sent to $P_2$ who uses secret key s to decrypt all of the values and determine the i index of the minimum by comparing the plain texts. The value i is returned to $P_1$.

5. $P_1$ performs the reverse mapping $r=\rho^-1(i)$.

6. The value r is returned, unless r does not refer to one of the original values in the set, in which case the protocol fails.

Analysis:

1. This step has no effect on the index of the minimum, but effective masks the value of the minimum.

2. The addition of values larger then existing elements in the set masks any relationship between the values, these additional values cannot and should not ever be the result of the minimum operation unless the service is lying or accumulator overflow occurred.

3. The random permutation blinds the servers result so that they cannot determine the actual value returned without the reverse permutation.

The secure arg min protocol provides the crucial operation needed to make use of the encrypted model parameters. Without the arg min service, the model parameters are meaningless numbers.

Accordingly, given the above illustrative descriptions, principles of the invention are able to perform oblivious decoding of a sequence. One party has a model of a dynamical process comprising a state machine that progresses from one state to another according to a particular distribution. While in each state, the model produces an observable symbol characterized by a state-dependent probability distribution. This party publishes the model, securely, by encrypting the parameters of said model using a homomorphic public key cryptographic method. Another party possesses a sequence of observed symbols and wishes to obtain the results of decoding this symbol sequence through the model, obtaining the most likely state sequence. This second party can use the properties of homomorphic encryption to compute the values necessary for each iteration of the Viterbi algorithm. The first party makes available a public-key based minimum-finding service that allows the two parties working together to compute the Viterbi solution and find the most likely state sequence, without disclosing the observed output to the first party (the publisher of the model). Using this method, then, parties possessing data may obtain the decoding results without ever learning the model parameters and without disclosing to the model publisher the symbols being classified.

It is to be appreciated that the principles of the invention can also be extended for use in an N-best decoding scheme. In such case, the minimum finding service would identify and return the N minimum scores. For example, if the minimum finding service identified and returned (from the possibly biased, permuted, and expanded set of values) the indices of the two smallest values rather than just the smallest, the decoder could identify the most likely state sequence, and the second most likely state sequence.

Figure 4:
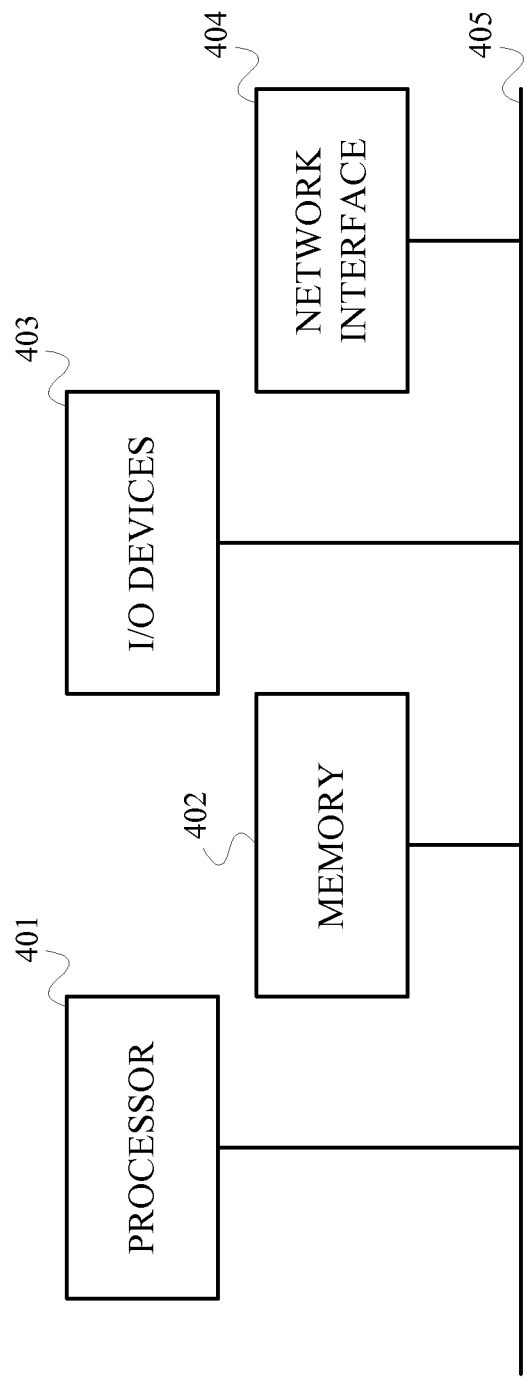
FIG. 4 is a diagram illustrating a computer system in accordance with which one or more components/steps of techniques of the invention may be implemented.

Lastly, FIG. 4 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 4 may represent one or more servers or one or more other processing devices capable of providing all or portions of the functions described herein. Alternatively, FIG. 4 may represent a mainframe computer system.

More particularly, the computer system represents a computing device used by each of the parties that are performing the secure decoding protocol of the invention (e.g., Alice and Bob).

The computer system may generally include a processor 401, memory 402, input/output (I/O) devices 403, and network interface 404, coupled via a computer bus 405 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for securely decoding data, the method comprising a computer system associated with a first party performing steps of:
    obtaining from a second party an encrypted model of a process for decoding data, wherein the encrypted model is a state machine-based model defined by one or more model parameters and wherein the one or more model parameters are encrypted so that the first party cannot learn the model parameters;
    utilizing the encrypted model parameters of the encrypted model to determine cost values which represent a particular sequence of observed outputs associated with a given data set of information that the first party wants to maintain as confidential and personal, which is to be decoded using the state machine-based model, without revealing content of the data set to the second party;
    sending to the second party the cost values;
    obtaining from the second party at least one index of a minimum cost value determined by the second party from the cost values sent thereto; and
    determining, as a most likely sequence for the given data set, a minimum cost sequence resulting from the at least one index;
    wherein the steps of obtaining, utilizing, sending, obtaining and determining are performed by the computer system executing program code, which is associated with the first party.

2. The method of claim 1, wherein the encrypted model further comprises a plurality of encrypted state transition costs.

3. The method of claim 1, wherein the encrypted model further comprises a plurality of encrypted costs associated with observed outputs.

4. The method of claim 1, wherein the encrypted model further comprises a plurality of initial state costs.

5. The method of claim 1, wherein the model is encrypted by a Paillier cryptographic method.

6. The method of claim 1, wherein the model is encrypted by an ElGamal cryptographic method.

7. The method of claim 1, wherein the model is encrypted by a Rivest-Shamir-Adleman cryptographic method.

8. The method of claim 1, wherein the cost values comprise a set of total partial costs which are combined with a randomly chosen bias value before sending.

9. The method of claim 1, wherein the step of obtaining from the second party at least one index of a minimum cost value further comprises obtaining from the second party the cost value closest to the minimum cost value, such the most likely state sequence and the second most likely state sequence are determined.

10. The method of claim 1, wherein the most likely sequence represents a decoding result such that the second party is not permitted to learn the sequence of observed outputs and the first party is not permitted to learn one or more parameters of the model that generated the sequence.

11. A method for securely decoding data, the method comprising a computer system associated with a first party performing steps of:
    encrypting a model of a process for decoding data, wherein the model that is encrypted is a state machine-based model defined by one or more model parameters and wherein the one or more model parameters are encrypted;
    sending the encrypted model to a second party such that the second party cannot learn the model parameters and utilizes the encrypted model parameters of the encrypted model to determine cost values which represent a particular sequence of observed outputs associated with a given data set of information that the first party wants to maintain as confidential and personal, which is to be decoded using the state machine-based model, without revealing content of the data set to the second party;
    obtaining from the second party the cost values;
    determining at least one index of a minimum cost value from the cost values obtained from the second party;
    sending the at least one index of the minimum cost value to the second party such that the second party determines, as a most likely sequence for the given data set, a minimum cost sequence resulting from the at least one index;
    wherein the steps of encrypting, sending, obtaining, and determining are performed by the computer system executing program code, which is associated with the first party.

12. A method of securely determining a minimum data value of a set of asymmetrically encrypted data values, the method comprising a computer system performing steps of:
    decrypting the values in the set of asymmetrically encrypted data values;
    comparing the values in the set of asymmetrically encrypted data values; and
    outputting an index of the minimum data value of the set of asymmetrically encrypted data values;
    wherein the set of asymmetrically encrypted data values comprises a public and private key pair, and numeric data values encrypted using the public key and transmitted to a holder of the private key, and wherein at least a portion of the numeric data values comprises one or more model parameters of a state machine-based model that is used to decode a given data set of information that another party, who holds the public key, wants to maintain as confidential and personal when decoding the given data set of information using the state machine-based model without revealing content of the data set to the holder of the private key;
    wherein the steps of decrypting, comparing and outputting are performed by the computer system executing program code.

13. The method of claim 12, wherein the set of asymmetrically encrypted data values is permuted randomly before transmission to another party, and a resulting returned index is mapped back to an original position before permutation.

14. The method of claim 12, wherein the set of asymmetrically encrypted data values is expanded to include additional values with total costs larger than the minimum cost.

15. Apparatus for securely decoding data, the apparatus being associated with a first party and comprising:
    a memory; and
    a processor coupled to the memory and configured to:

obtain from a second party an encrypted model of a process for decoding data, wherein the encrypted model is a state machine-based model defined by one or more model parameters and wherein the one or more model parameters are encrypted so that the first party cannot learn the model parameters;

utilize the encrypted model parameters of the encrypted model to determine cost values which represent a particular sequence of observed outputs associated with a given data set of information that the first party wants to maintain as confidential and personal, which is to be decoded using the state machine-based model, without revealing content of the data set to the second party;

send to the second party the cost values;

obtain from the second party at least one index of a minimum cost value determined by the second party from the cost values sent thereto; and determine, as a most likely sequence for the given data set, a minimum cost sequence resulting from the at least one index.

16. The apparatus of claim 15, wherein the encrypted model further comprises a plurality of encrypted state transition costs.

17. The apparatus of claim 15, wherein the encrypted model further comprises a plurality of encrypted costs associated with observed outputs.

18. The apparatus of claim 15, wherein the encrypted model further comprises a plurality of initial state costs.

19. The apparatus of claim 15, wherein the cost values comprise a set of total partial costs which are combined with a randomly chosen bias value before sending.

* * * * *